Aug. 13, 1968  W. E. BALLARD  3,396,516
BAGHOUSE APPARATUS
Filed Aug. 2, 1966                                3 Sheets-Sheet 1
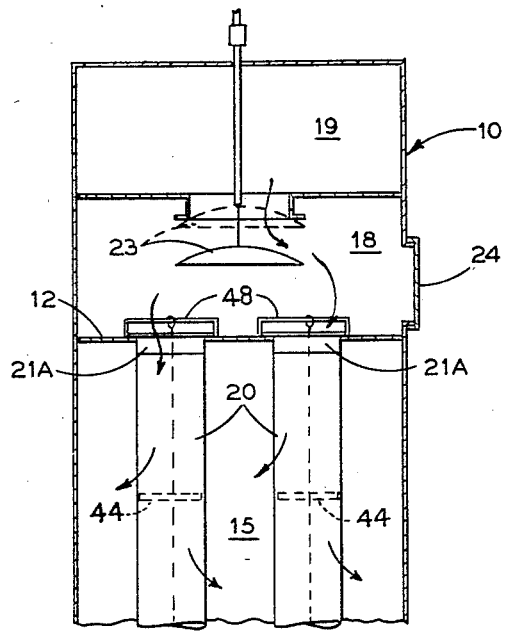
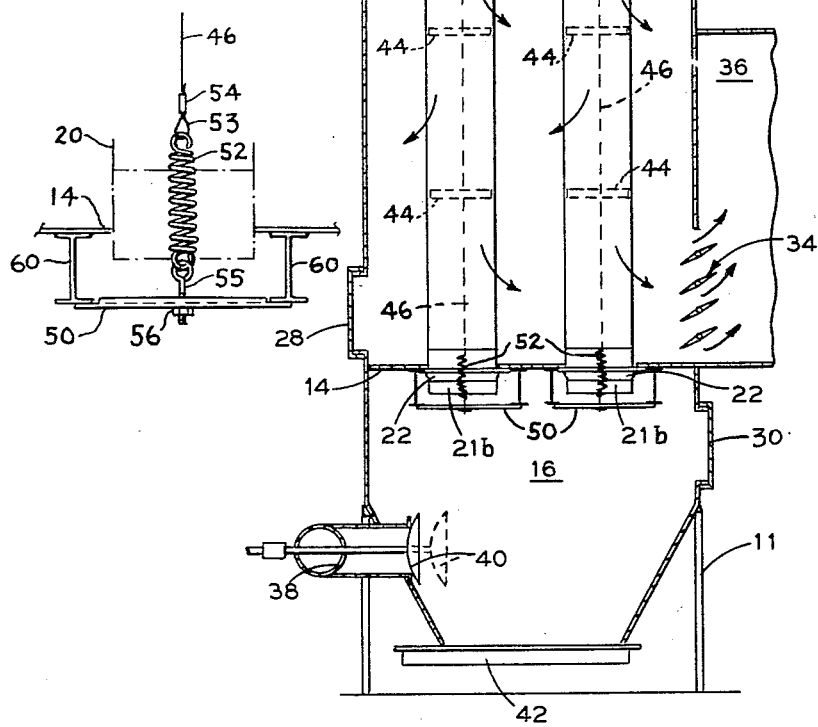
INVENTOR.
Wade E. Ballard
BY
*J. P. Moran*
ATTORNEY

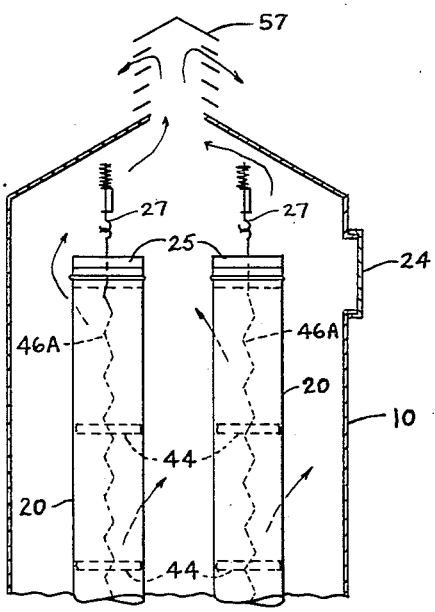
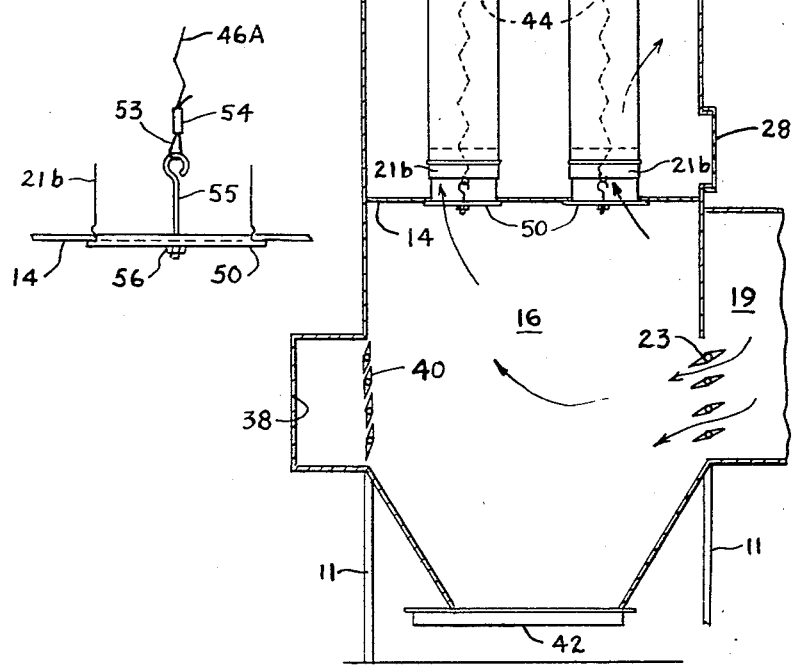

United States Patent Office 3,396,516
Patented Aug. 13, 1968

3,396,516
BAGHOUSE APPARATUS
Wade E. Ballard, Rolling Hills, Calif., assignor to Menardi & Company, Torrance, Calif., a corporation of California
Filed Aug. 2, 1966, Ser. No. 569,660
2 Claims. (Cl. 55—302)

ABSTRACT OF THE DISCLOSURE

This invention involves the construction and mounting of anti-collapse metal rings positioned within but separate from a tubular filter bag of gas-pervious fibrous material through which a gas flow is periodically reversed to clean the bag of accumulated particulate matter.

---

Figure 5:
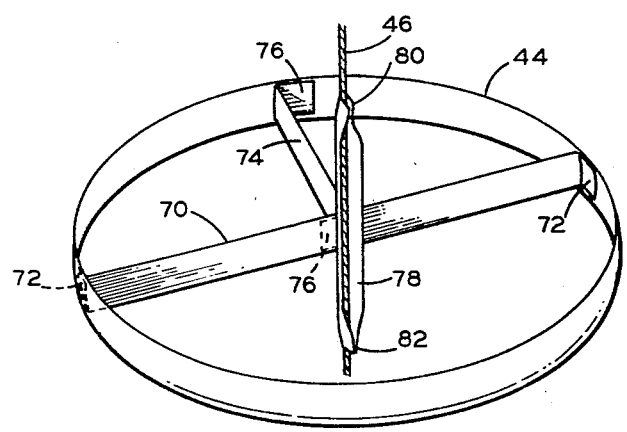

This invention relates to apparatus for baghouses which employ tubular filter bags for separating entrained particulate matter from air or other gases, and more particularly to improved means for holding the filter bags against complete collapse when there is an inward flow of gas through the bag walls.

Conventional baghouses include a casing defining an internal filter chamber in which are disposed a plurality of tubular filter bags, preferably made of glass or other ceramic fiber material capable of withstanding elevated temperatures such as 550° F. and higher. The filter bags are suitably tensioned and held in expanded condition by a ring assembly in order to prevent the formation of flow-impeding folds or pleats which sharply bend the brittle fiber and tear the fabric.

During a cleaning operation to effect removal and disposal of particulate matter deposited on the inner surface of the filter bag, the direction of gas flow is reversed so as to pass the gas from outside the bag to the interior thereof, thus tending to collapse the filter bag. Provision is therefore made to resist such collapse and the formation of pleats by means of anti-collapse rings carried on a depending support and disposed inside the bag at spaced locations along the length thereof, although there is annular clearance between the rings and the expanded filter bags which minimizes rubbing contact during normal filtering operation. One problem with internal anti-collapse rings, however, is that they have been known to swing violently with their supporting member into destructive contact with the filter bag when excited as by vibrations and turbulent gas flow.

Each anti-collapse ring is provided with a diametrically extending cross bar and preferably a radial reinforcing member which not only add structural rigidity to the ring, but also provide a convenient central location for novel means for attaching the ring to an elongated ring-supporting member or cable. The latter extends longitudinally of the filter bag throughout the length thereof and through the centers of the rings. According to the present invention, means are further provided for tensioning the anti-collapse ring structure in longitudinal direction. The novel means for attaching each ring to the cable also minimizes the chance for cocking of the ring out of horizontal attitude.

In one embodiment of the invention a helical tension spring is connected between the lowermost ring of the anti-collapse structure and the adjacent lower structure, to thereby apply tension to the entire ring assembly. In another embodiment of the present invention the anti-collapse rings are secured centrally thereof to a resilient tensioning member which takes the place of plain cable and extends throughout the entire ring assembly, being stretched between the upper and lower supporting structures. This resilient tensioning member may take the form of a stainless steel rod or cable which is crimped at a multiplicity of locations along the length thereof to yieldingly resist tension and yet maintain a taut connection between the upper and lower bag supporting structures.

The novel means for attaching the rings to the cable may comprise a vertically elongated channel member secured, as by spot welding, to the diametrical cross bar and adapted to receive the cable and be secured thereto by crimping of the channel member at upper and lower end portions thereof.

In the drawings:
FIGURE 1 is a partly schematic vertical sectional view of a baghouse embodying the invention;
FIGURE 2 is an enlarged elevational view of a portion of the baghouse of FIG. 1, showing certain components in detail;
FIGURE 3 is a view similar to FIG. 1 but showing a modified baghouse embodying the invention;
FIGURE 4 is an elongated elevational view of a portion of the baghouse of FIG. 3, showing certain components in detail; and
FIGURE 5 is an enlarged perspective view of a portion of the ring assembly for the baghouses of FIGS. 1 and 3.

The baghouse of FIGURE 1 has a metal casing 10 supported on legs 11 and provided internally with vertically spaced, upper and lower, apertured horizontal tube sheets 12 and 14 defining a vertically elongated filter chamber 15 between them. Below the lower tube sheet 14 is a hopper 16 and immediately above the upper tube sheet 12 is a plenum chamber 18. The latter communicates with an inlet duct 19 immediately above it.

Disposed within the filter chamber 15 are a plurality of vertically elongated filter bags 20, preferably made in tubular form of glass, or other ceramic, fiber material which is heat resistant to 550° F. or higher. The bags 20 are held at the ends thereof by upper and lower thimbles 21a and 21b so as to extend between vertically aligned, corresponding apertures in the respective tube sheets 12 and 14.

The upper and lower thimbles 21a and 21b may be of the type disclosed in U.S. Patent 3,177,636, issued Apr. 13, 1965 in the name of Robert M. Jensen, although the present invention is not so limited. It will suffice to say that the thimbles 21a and 21b serve to receive and hold the upper and lower ends of the filter bags 20, and to protect the delicate fabric from any rough or sharp edges rimming the tube sheet apertures in which the thimbles are received. The filter bags 20 may be placed in tension, as described in the cited Jensen patent, by applying a downward force on each lower thimble 21b. Next, an adjustable annular clamp 22 is securely fastened around the thimble 21b in position to bear against the lower surface of the lower tube sheet 14 and thereby maintain the initially applied tension.

An inlet damper 23 controls the flow of dirty gas from the inlet duct 19 to the plenum 18. A door 24 in the casing 10 provides access to the upper plenum 18; another door 28 provides access to the filter chamber 15; and still another door 30 provides access to the hopper 16. These doors 24, 28 and 30 close manholes which admit workmen.

During normal filtering operation, with the components of the apparatus positioned as shown in FIG. 1, the dirty gas passes from the inlet duct 19, through the damper 23 and the plenum 18, next into the open upper end of the filter bags 20, after which it flows downwardly and through the bag walls as indicated by the arrows, exiting from the filter chamber 15 through an open exhaust damper 34 into an exhaust duct 36. From the exhaust duct 36 the filtered gas may be discharged to the atmosphere or to a point of use.

During the filtering operation a deflation duct 38 leading from the hopper 16 is closed by a deflation damper 40 positioned as shown with solid lines in FIG. 1. Filtered particles collected on the inner surface of the filter bags 20 fall into the hopper 16 and are carried away by a screw conveyor 42 located at the bottom of the hopper.

The deflation duct 38 is open with the deflation damper 40 in the dotted line position of FIG. 1 in order to clean the filter bags, at which time filtered gas is drawn from the exhaust duct 36 through the open damper 34 into the filter chamber 15, from whence it flows through the bag walls in a direction opposite to that shown by the arrows. Next, the gas and the removed particles flow downwardly through the filter bags into the hopper 16 and then pass by the open deflation damper 40 to exit through the deflation duct 38. Of course, some of the particulate matter falls to the bottom of the hopper 16 and is carried away by a screw conveyor 42. A suitable fan (not shown) is operatively associated with the deflation duct 38 for sucking the clean gas or air in the path described from the exhaust duct 36 to the deflation duct 38. Although not shown, it is to be understood that the now dirty gas leaving the deflation duct 38 during the bag cleaning operation may be fed into the inlet duct 19 for delivery to one or more filter chambers 15 which are on the filtering cycle. Since the fiberglass bags 20 can withstand temperatures up to 600° F., gases can be filtered at such temperature by introducing them directly to the filter chamber 15 without the preliminary step of reducing gas temperature to the temperature capability of the filter bag material, as is often required with such synthetic materials as Dacron. Recognizing that fiberglass filter bags 20 are easily torn when bruised or sharply bent, the present invention provides means for guarding the filter bags 20 from bruises and sharp bends, during normal filtering or cleaning operation. Furthermore, by preventing the formation of pleats, the filtering effectiveness of the filter bags is improved. To this end, the apparatus shown in FIG. 1 employs a vertical series of anti-collapse rings 44 loosely disposed within each filter bag 20 and carried on a longitudinally extending cable 46 between the upper and lower arms, 48 and 50 respectively. The cable 46 is placed in tension by means of a coil spring 52 to guard against transverse movement of the rings 44 which might otherwise cause rubbing or penetrating contact with the filter bag 20.

As best seen in FIG. 2, a hooked upper end of spring 52 is connected to a formed eye 53 at the lower end of cable 46 secured by a ferrule 54; and a hooked lower end of spring 52 is connected to an eye bolt 55 which is secured by nut 56 to the lower arm 50. The latter bears with opposite end portions against the underside of I-beams 60 supporting the lower tube sheet 14. This arrangement provides adequate tension on the cable 46 to minimize transverse movement of the rings 44.

The other form of baghouse shown in FIG. 3, with parts set for filtering operation, has correspondingly similar parts identified with like reference numerals. Briefly stated, a lower horizontal tube sheet 14 partitions the filter chamber 15 within the casing 10 from the hopper 16. This being a bottom entry unit, the upper end of each filter bag 20 is connected to an imperforate cap 25 suspended from an upper portion of the casing 10 by means of a resiliently mounted hook 27. The lower end of each bag 20 is held in tension by a lower thimble 21b. Anti-collapse rings 44 are carried by a unique cable 46A extending between hook 27 and eye bolt 55, there being an eye 53 formed at opposite ends of cable 46A to facilitate connection. In this embodiment, the eye bolt 55 is secured by a nut 56 to a lower arm 50 which bears with opposite ends thereof through the lower thimble 21b against the bottom of the lower tube sheet 14.

The baghouse of FIG. 3 has an exhaust stack 57 at the top of casing 10 for the discharge of filtered gas from filter chamber 15. In this arrangement, dirty gas from an inlet duct 19 flows through an open inlet damper 23, through hopper 16 and upwardly into the open lower end of filter bag 20, then upwardly along the length of bag 20 and through the sidewall thereof into the filter chamber 15. Particles filtered from the dirty gas are collected on the inner surface of the bags 20. During filtering operation, the deflation damper 40 is in the illustrated closed position to close off the deflation duct 38. However, for cleaning the filter bags 20 the deflation damper 40 is opened and the inlet damper 23 is closed to draw clean air in reverse direction, to break up encrusted particulate matter and pass it to the hopper 16 for discharge by the conveyor 42.

The connection between the rings 44 and the cable of FIGS. 1 and 3 is shown schematically in these views, although the connection will be fully described hereinafter. The stainless steel cable 46A of FIGS. 3 and 4 is unique in that it is crimped to have an undulated or sinuous form along portions of its length between connections to the rings 44. This form of cable 46A is inherently tensive, so that this embodiment of the invention does not require the tension spring 52 of the embodiment of FIGS. 1 and 2 to hold the ring assembly in tension and thus prevent the lateral movement of the rings 44 which might otherwise damage the bags 20.

Referring now especially to FIG. 5 of the drawings, the anti-collapse ring structure will now be described in detail, although the invention can be practiced with variations.

Each such structure includes a vertical series of rings 44 disposed horizontally within the filter bag 20, and in spaced relation thereto. For example, for a filter bag 20 having an inside diameter of approximately 11½ inches the extreme outside diameter of the ring may be at least $\frac{1}{16}$ of an inch smaller in diameter in order to provide an annular clearance of at least $\frac{1}{32}$ inch between the ring 44 and the filter bag 20.

Preferably, the ring 44 is of rounded cross section of 1½" radius in order to present an outwardly facing convex surface to the inside of the filter bag 20. The ring 44 may be 1 inch wide and formed from stainless steel sheet $\frac{3}{32}$" thick.

Each ring 44 is combined with a diametrically extending chord member 70 having end tabs 72 for securing the chord member to the ring, as by spot welding. The end tabs 72 are approximately at right angles to the chord member 70, and they extend in respective opposite directions. In addition, a reinforcing member 74 extends radially and perpendicularly to the chord member 70 from a position midway between its ends to the inside surface of the ring 44, with each end of the reinforcing member also being provided with an end tab 76 bent at approximately right angles thereto so that spot welds can be employed to secure the reinforcing member to the chord member 70 and the ring 44 as shown.

In order to secure each ring 44 to the vertically extending cable 46 or 46A in a manner which minimizes cocking of the ring from a horizontal attitude, a vertically extending channel member 78 is secured, as by spot welding, to the chord member 70 on the side thereof opposite the tab 76 of the reinforcing member 74. As shown, the channel member 78 is positioned centrally of the ring 44 in order to guide the cable centrally and axially of the series of rings 44. And the cable is firmly secured to each chord member 70 by the simple procedure of crimping the upper and lower ends of each channel member 78, as at 80 and 82 respectively.

The present baghouse apparatus is to be distinguished from those of the kind which accomplish cleaning of the filter bags by shaking or vibrating the bags or their supporting structure, a practice which is considered to be destructive of filter bags and especially fiberglass bags. Rather, the filter bags and associated structure of the present invention are held securely against movement, and bag cleaning is accomplished by periodically directing preferably clean air or gas under pressure inwardly of the bags through the sides thereof to break up encrustations of accumulated dust and carry them down into the hopper 16 for disposal by the conveyor 42. Such periodic cleaning is accomplished between usually longer periods of filtering operation, preferably under the control of automatic damper positioning means (not shown). It is also to be appreciated that dirty gas to be filtered, as from a furnace, is already at superatmospheric pressure and that filtered gas is at superatmospheric pressure slightly lower than the ditry gas. Thus, the flow of gas as aforesaid can be accomplished without auxiliary fan equipment, although such fan equipment can be employed to further pressurize gas and assist in forcing the flow of gas in the directions mentioned above in practicing the invention.

What is claimed is:
1. Filter apparatus comprising:
    (a) a casing having a filter chamber therewithin,
    (b) upper and lower structures vertically spaced within said casing at upper and lower end portions of said filter chamber,
    (c) a dust-collecting filter bag of elongated tubular construction and made of flexible gas-pervious material,
    (d) first means attaching the ends of said bag respectively to said upper and lower structures and holding said bag in tension between said ends, with at least one end of said bag begin normally open to the flow of dust-laden dirty gas to be filtered,
    (e) means for directing dirty gas under pressure into the open end of said bag whereby said bag is maintained in fully expanded condition as filter gas flows outwardly through the side of said filter bag and dust is collected on the inner surface thereof during filtering operation of said apparatus,
    (f) means for directing clean gas under pressure into said bag through the side thereof and then out the open end thereof to remove accumulated dust from the inner surface of said bag during a cleaning operation between periods of filtering operation of said apparatus,
    (g) a plurality of rigid rings having an outside diameter slightly less than the inside diameter of the bag when the latter is in fully expanded condition during filtering operation to provide annular clearance between said rings and said bag, said rings extending annularly about the longitudinal axis of said bag and being longitudinally spaced apart between the ends of said bag, said rings holding said bag against complete collapse during said cleaning operation,
    (h) said bag intermediate the ends thereof being free of attachment to said rings and being out of contact with said rings during filtering operation,
    (i) second means connected to said upper end lower structures and extending therebetween longitudinally of said bag within the periphery of said rings for positionally attaching said rings within said bag, said second means including a portion which is tensive in longitudinal direction in order to resist transverse movement thereof and said rings relative to said bag for maintaining the annular clearance between said bag and said rings, and
    (j) said second means comprising a longitudinally extending cable made of resilient metal material and having a series of undulations formed therein to provide said tensive portion.

2. Filter apparatus according to claim 1 further including reinforcing structure within the periphery of said rings and wherein said reinforcing structure includes a diametrically extending chord member, said second means includes a longitudinally extending cable and said longitudinally extending member is a channel member which is rigidly connected to said chord member midway between its ends and receives said cable, said channel member being crimped at upper and lower end portions to establish a secure connection with said cable.

References Cited

UNITED STATES PATENTS

| | | | |
|---|---|---|---|
| 1,843,639 | 2/1932 | Hansen | 55—341 X |
| 2,976,953 | 3/1961 | Haas et al. | 55—341 X |
| 3,177,636 | 4/1965 | Jensen | 55—341 |
| 3,186,147 | 6/1965 | O'Dell | 55—302 X |
| 3,292,348 | 12/1966 | Normand | 55—379 |
| 3,333,403 | 8/1967 | Ballard et al. | 55—379 |

FOREIGN PATENTS

| | | |
|---|---|---|
| 563,797 | 1/1958 | Belgium. |
| 44,495 | 9/1888 | Germany. |
| 345,918 | 12/1921 | Germany. |
| 484,215 | 10/1929 | Germany. |
| 1,023,083 | 3/1966 | Great Britain. |

HARRY B. THORNTON, *Primary Examiner.*

S. W. SOKOLOFF, *Assistant Examiner.*